Figure 1:
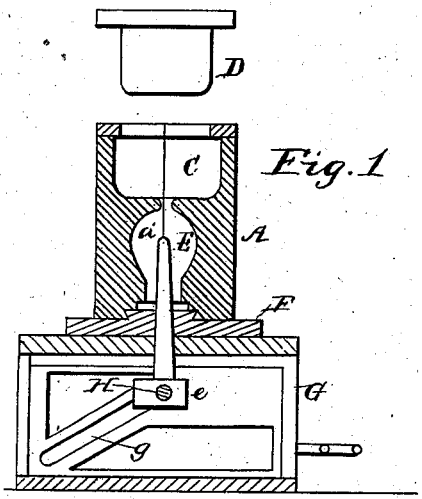

No. 730,078. PATENTED JUNE 2, 1903.
J. I., C. V., F. J., F. L. & P. R. ARBOGAST.
METHOD OF MANUFACTURING GLASSWARE.
APPLICATION FILED SEPT. 30, 1902.
NO MODEL.

WITNESSES:
James O'Neil
Geo. M. Copenhaver

INVENTORS
John I. Arbogast
Charles V. Arbogast
Francis J. Arbogast
Frederick L. Arbogast
and Philip R. Arbogast BY Connolly Bro.
ATTORNEYS No. 730,078. Patented June 2, 1903.

UNITED STATES PATENT OFFICE.

JOHN I. ARBOGAST, CHARLES V. ARBOGAST, FRANCIS J. ARBOGAST, FREDERICK L. ARBOGAST, AND PHILIP R. ARBOGAST, OF PITTSBURG, PENNSYLVANIA.

METHOD OF MANUFACTURING GLASSWARE.

SPECIFICATION forming part of Letters Patent No. 730,078, dated June 2, 1903.

Application filed September 30, 1902. Serial No. 125,381. (No specimens.)

*To all whom it may concern:*

Be it known that we, JOHN I. ARBOGAST, CHARLES V. ARBOGAST, FRANCIS J. ARBOGAST, FREDERICK L. ARBOGAST, and PHILIP R. ARBOGAST, citizens of the United States, residing at Pittsburg, in the county of Allegheny and State of Pennsylvania, have invented certain new and useful Improvements in Methods of Manufacturing Glassware; and we do hereby declare the following to be a full, clear, and exact description of the invention, such as will enable others skilled in the art to which it appertains to make and use the same.

Our invention has relation to methods of making glassware, and has for its object the provision of a novel method of manufacture whereby the output will be increased, the cost diminished, and a greater uniformity in size, weight, and finish secured than where the ordinary methods are employed.

Heretofore in the manufacture of hollow glassware the method commonly practiced has been to gather a mass of molten glass on the end of a blowpipe and by means of the various manipulations known as "blocking," "marveling," "swinging," "blowing," &c., to work the mass of glass to the required size and shape. Each and all of these operations require such an intimate acquaintance with the nature and unique characteristics of glass, such deftness of hand, acuteness in observing the condition of the glass as the work progresses, and a faculty of instantly varying the manipulation to meet the constant changes of form, size, and other conditions of the glass that occur during its manipulation that proficiency is only obtained by years of application and practice under competent instruction. As a natural consequence of the great skill and practice required in order to be able to blow glass properly the skilled workmen in this art command very high wages and the services of a sufficient number are not always readily obtainable.

In the manufacture of certain articles of glassware where the configuration of the article will allow the operation of blowing is facilitated and the cost of articles produced is lessened by blowing the articles in a mold after the preliminary steps of gathering, blocking, marveling, and partially blowing, such blowing in a mold being to a substantial finish of the article or being followed by hand-finishing with suitable tools.

In the method which forms the subject of our present invention we dispense with the services of the highly-skilled blower and in a large degree with skilled labor of any kind, and we produce by the aid of unskilled operatives articles of glassware unequaled in uniformity of weight, size, and finish and at a very much lower cost than can be attained by glass-blowers of the highest class operating under the common method of hand-working as above described.

Our present method, briefly stated, consists in forming a number of blanks of suitable character and before the blanks have entirely lost their initial heat gradually and simultaneously reheating a number of the blanks in such manner that they will successively reach a state of suitable plasticity for subsequent working and then forming the reheated blanks to the desired shape.

In the accompanying drawings we have shown an apparatus adapted to the carrying into effect of our method, such apparatus comprising a press-mold for forming the blanks, a reheating-furnace containing a carrier for conveying the blanks through the reheating-furnace in continuous procession from a point of lesser to a point of greater heat, and a glory-hole where the reheated blanks may, if necessary, be still further heated to produce the plasticity required for their final manipulation to completed form, and in the drawings, wherein—

Figure 2:
Figure 5:
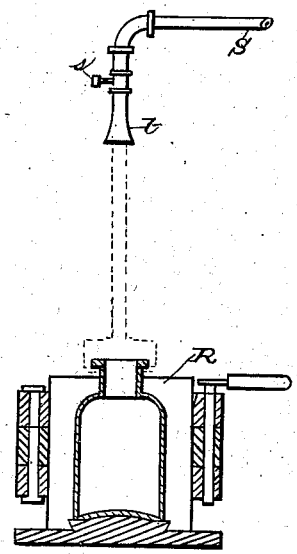
Figures 3, 4:
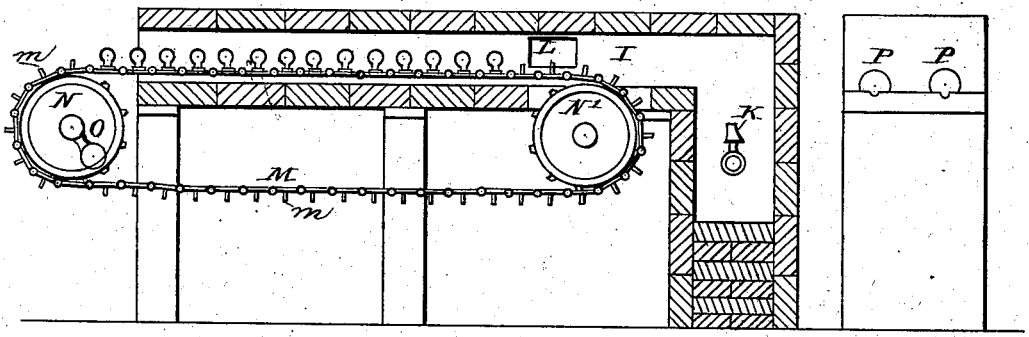

Figure 1 is a vertical longitudinal sectional view of a press-mold and plunger adapted to be mounted on a glass-press of any of the well-known kinds. Fig. 2 is a sectional view of a blank formed in the mold, Fig. 1. Fig. 3 is a vertical longitudinal sectional view of a reheating-furnace for reheating the blanks. Fig. 4 is an elevation of a glory-hole furnace for giving a supplementary heating to the blanks, if such supplementary heating be found necessary; Fig. 5, a vertical sectional view of a mold adapted to give a finished shape to the article to be produced, and Fig. 6 another form of mold in which an article is to be produced that is severed from the remainder of the glass in the blank on the dotted line $x$ $x$ after it has been removed from the mold.

A designates a press-mold having a cavity $a$ for the formation of the blank B. (Shown in Fig. 2.) C designates a cup which is formed in the upper part of the mold A and is designed to receive a mass of glass that is pressed into the cavity $a$ by a plunger D. Within the cavity $a$ of the mold is arranged a vertically-movable plug E, that is mounted on a block $e$ and passes through the bottom plate F of the mold and is caused to ascend into and descend out of the mold-cavity $a$ by means of a slide G, having an oblique slot $g$ on each side, in which works a horizontal pin H on the block $e$. The operation of these parts is as follows: The mold A being mounted on a suitable press and the plunger D secured to the movable cross-head of the same, a quantity of molten glass is put in the cup C, and the plunger being brought down the glass is pressed into the cavity of the mold and around the plug E and takes the form shown in Fig. 2. After the blank has been formed the plug is withdrawn from the blank by drawing back the slide G, and the mold is then opened and the blank and the adherent mass of glass which remains in the cup removed and the blank broken off from the mass and before it becomes entirely cold carried to the reheating-furnace.

The reheating-furnace, which is shown in Fig. 3, is composed of a horizontal chamber I, which may be made of fire-brick or any other suitable material and which has at one end an opening for the admission of gas for heating from a burner K and in one or both sides an opening L for the removal of the blanks as they become heated to the desired degree. An endless chain M, running on sprockets N N', passes through the chamber I and back under the bottom of the same, and the sprocket N is turned and the chain caused to travel in the direction of the arrow by means of a handle O. The chain M is provided with upright pins $m$ $m$, arranged at suitable distances apart, and the blanks are set upon these pins at the cooler end of the chamber I and by the movement of the chain are gradually advanced in a continuous line toward the hotter end of the chamber, and as they reach the openings L, having become heated to the desired degree, are removed through said openings, and if a higher degree of heat is required than that which they have attained in the chamber I they are placed on the ends of blow-snaps and still further heated at the glory-holes P and are then blown to the required shape and size in the mold R.

The blowing of the blanks to completed shape in the mold R is preferably effected by means of compressed air brought from a suitable source of supply through a pipe S, which has a cock $s$, by means of which the supply of air can be regulated, and a mouthpiece $t$, adapted to fit over the ends of the hollow blow-snaps.

By having two or more pins in alinement laterally on the chain M or by having two or more chains within the chamber the blanks may be put on the chain and pass through the reheating-chamber in pairs or groups and may be removed and blown to their final shape in pairs or groups, either by having several blow-molds or a single blow-mold with a plurality of cavities.

It will be obvious to those skilled in the art of glass-making that the precise form of apparatus above described is not essential to the carrying out of our method and that the mechanical appliances may be varied in construction and operation and that others may be employed in addition to or in lieu of those described and shown.

With the apparatus above described or by means of apparatus of a similar character, which may be readily devised, our method is carried into effect in the following manner: The blanks as they are formed, or at least before the glass has lost its initial heat to such an extent as to be deleteriously affected by the cooling which ensues when they are exposed to the air, are placed singly or in pairs or groups on the pins on the chain M, and the chain being caused to move through the chamber by turning the handle O the blanks are moved forward in the direction of the arrow and gradually reheated until they have acquired the desired temperature, when they are removed through the openings L, placed on the ends of blow-snaps, and, if necessary, are given a further heating at the glory-hole P and then blown to shape in the mold R and from thence removed to a suitable leer or tempering-chamber. Particular attention is called to the fact that all the blanks which are in the reheating-chamber at any time are being reheated simultaneously, but that each blank or pair or group of blanks, when they are put in in pairs or groups, as they progress toward the hotter end of the chamber successively acquire the same degree of heat acquired by the preceding blank or pair or group of blanks at a given point, so that there will be a constant procession of blanks or pairs or groups of blanks passing through the reheating-chamber and being successively heated to a required degree. After the blanks have been reheated and removed from the reheating-chamber they are blown to the desired shape either in the usual manner or preferably by compressed air in the manner hereinbefore described, and when they have been blown the completed articles are removed to a suitable annealing-chamber or leer and properly annealed.

Figure 6:
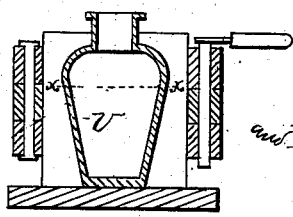

In making certain classes of articles—such, for instance, as punch-tumblers—which may be formed in the mold shown in Fig. 6, in which figure the blank is shown blown to completed shape in the mold, the upper part is cracked off on the line $xx$ after the blown article has been removed from the mold, leaving the punch-tumbler U, which is finished by grinding or glazing its edge.

Having described our invention, we claim—

1. The method of manufacturing glassware consisting in forming suitable blanks, then, while the blanks retain a portion or their initial heat, simultaneously reheating them and successively raising them to a determined temperature by increasing heat and then forming them to the desired shape.

2. The method of manufacturing glass, consisting in forming suitable blanks, then, while the blanks retain a portion of their initial heat, reheating them in a succession of pairs or groups and, while all the pairs or groups are being simultaneously reheated, successively raising the temperature of each pair or group to a suitable degree by increasing heat and then removing the blanks accordingly as they reach the desired temperature and then forming them to the desired shape.

3. The method of manufacturing glassware, consisting in forming suitable blanks, then, while the blanks still retain a portion of their initial heat, reheating a number of them simultaneously, and then, when they have become sufficiently softened, forming them to the desired shape.

4. The method of manufacturing glassware consisting in forming suitable blanks and, while they retain a portion of their initial heat, reheating a number of them simultaneously, then further heating them successively, then, forming them to the required shape and then annealing them.

5. The method of manufacturing glassware consisting in forming suitable blanks and, while they retain a portion of their initial heat, reheating a number of the blanks simultaneously, then successively blowing the blanks so that a completed shape will be given to a portion of the blank, then severing such completed shape from the remainder of the blank.

In testimony whereof we have affixed our signatures in presence of witnesses.

JOHN I. ARBOGAST.
CHARLES V. ARBOGAST.
FRANCIS J. ARBOGAST.
FREDERICK L. ARBOGAST.
PHILIP R. ARBOGAST.

Witnesses:
WM. S. LOUCKS,
WM. L. MEERY,
A. A. CONNOLLY,
J. B. CONNOLLY.